US007728880B2

(12) United States Patent
Hung et al.

(10) Patent No.: US 7,728,880 B2
(45) Date of Patent: Jun. 1, 2010

(54) AUTOMATIC WHITE BALANCE METHOD AND APPARATUS

(75) Inventors: Szepo (Bob) Hung, Carlsbad, CA (US); Ananthapadmanabhan Kandhadai, San Diego, CA (US); Andrew Chinchuan Chiu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1346 days.

(21) Appl. No.: 11/043,572

(22) Filed: Jan. 25, 2005

(65) Prior Publication Data
US 2005/0286097 A1 Dec. 29, 2005

Related U.S. Application Data

(60) Provisional application No. 60/583,144, filed on Jun. 25, 2004.

(51) Int. Cl.
H04N 9/73 (2006.01)
H04N 5/228 (2006.01)
H04N 5/202 (2006.01)
H04N 5/20 (2006.01)
H04N 1/46 (2006.01)
G03F 3/08 (2006.01)
G06K 9/00 (2006.01)

(52) U.S. Cl. ............ 348/223.1; 348/222.1; 348/225.1; 348/227.1; 348/254; 348/255; 358/516; 358/518; 358/520; 358/509; 382/162; 382/163; 382/167

(58) Field of Classification Search ............ 358/509, 358/516, 518, 3.02, 1.9, 520; 348/222.1–229.1, 348/254–256, 241, 221.1; 382/162, 167, 382/190–194
See application file for complete search history.

(56) References Cited

U.S. PATENT DOCUMENTS 5,448,502 A * 9/1995 Kindo et al. ............ 382/165

(Continued)

FOREIGN PATENT DOCUMENTS

EP 0658058 6/1995

(Continued)

OTHER PUBLICATIONS

Cooper, T., (2001) Color segmentation as an aid to white balancing for digital still cameras. Proceedings of SPIE vol. 4300, pp. 164-171.

(Continued)

Primary Examiner—Jason Chan
Assistant Examiner—Michael Osinski
(74) Attorney, Agent, or Firm—Kyong Macek; Espartaco Diaz Hidalgo

(57) ABSTRACT

Automatic white balance of captured images can be performed based on a gray world assumption. Initially, a flat field gray image is captured for one or more reference illuminations. The statistics of the captured gray image are determined and stored for each reference illumination during a calibration process. For each subsequent captured image, the image is filtered to determine a subset of gray pixels. The gray pixels are further divided into a one or more gray clusters. The average weight of the one or more gray clusters is determined and a distance from the average weights to the reference illuminants is determined. An estimate of the illuminant is determined depending on the distances. White balance gains are applied to the image based on the estimated illuminant.

47 Claims, 6 Drawing Sheets

U.S. PATENT DOCUMENTS

| | | | |
|---|---|---|---|
| 5,644,406 | A | 7/1997 | Harrington et al. |
| 6,665,434 | B1* | 12/2003 | Yamaguchi .................. 382/162 |
| 6,788,813 | B2* | 9/2004 | Cooper ....................... 382/167 |
| 6,791,606 | B1* | 9/2004 | Miyano ................... 348/223.1 |
| 7,102,669 | B2 | 9/2006 | Skow |
| 7,146,041 | B2* | 12/2006 | Takahashi ................... 382/167 |
| 2003/0052978 | A1* | 3/2003 | Kehtarnavaz et al. .... 348/223.1 |
| 2004/0120575 | A1* | 6/2004 | Cheng ........................ 382/167 |
| 2005/0219379 | A1* | 10/2005 | Shi .......................... 348/223.1 |
| 2006/0290957 | A1* | 12/2006 | Kim et al. .................... 358/1.9 |
| 2007/0133071 | A1* | 6/2007 | Noyes et al. ................ 358/516 |
| 2008/0101690 | A1* | 5/2008 | Hsu et al. ................... 382/162 |

FOREIGN PATENT DOCUMENTS

| | | |
|---|---|---|
| EP | 1311111 | 5/2003 |
| WO | 0207426 | 1/2002 |

OTHER PUBLICATIONS

International Search Report—PCT/US2005/022834, International Search Authority—European Patent Office—Oct. 25, 2005.

Written Opinion—PCT/US2005/022834, International Search Authority—European Patent Office—Oct. 25, 2005.

International Preliminary Report on Patentability—PCT/US2005/022834, International Search Authority—IPEA/US—Alexandria, Virginia—Jan. 25, 2007.

* cited by examiner

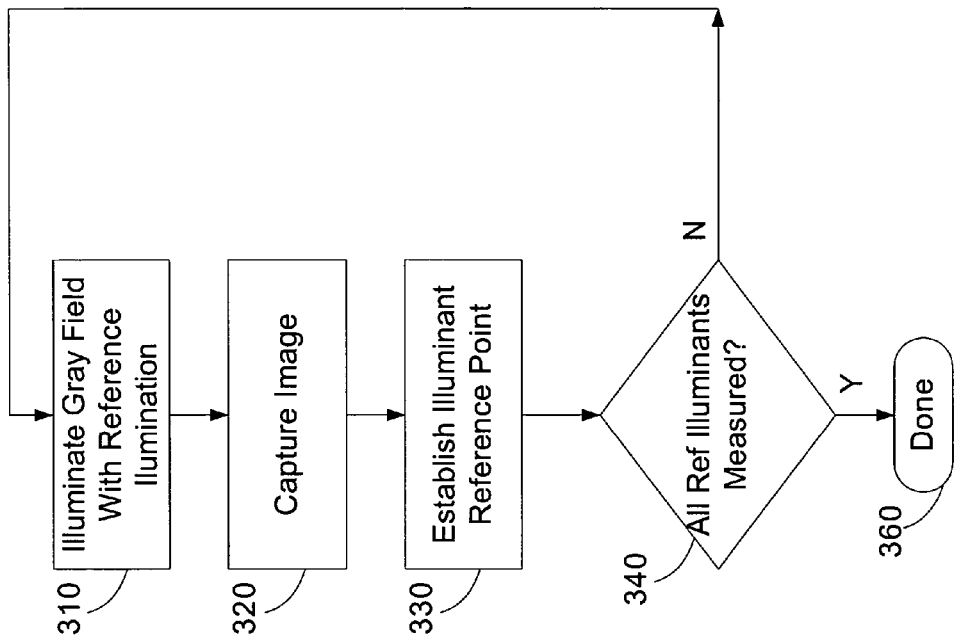

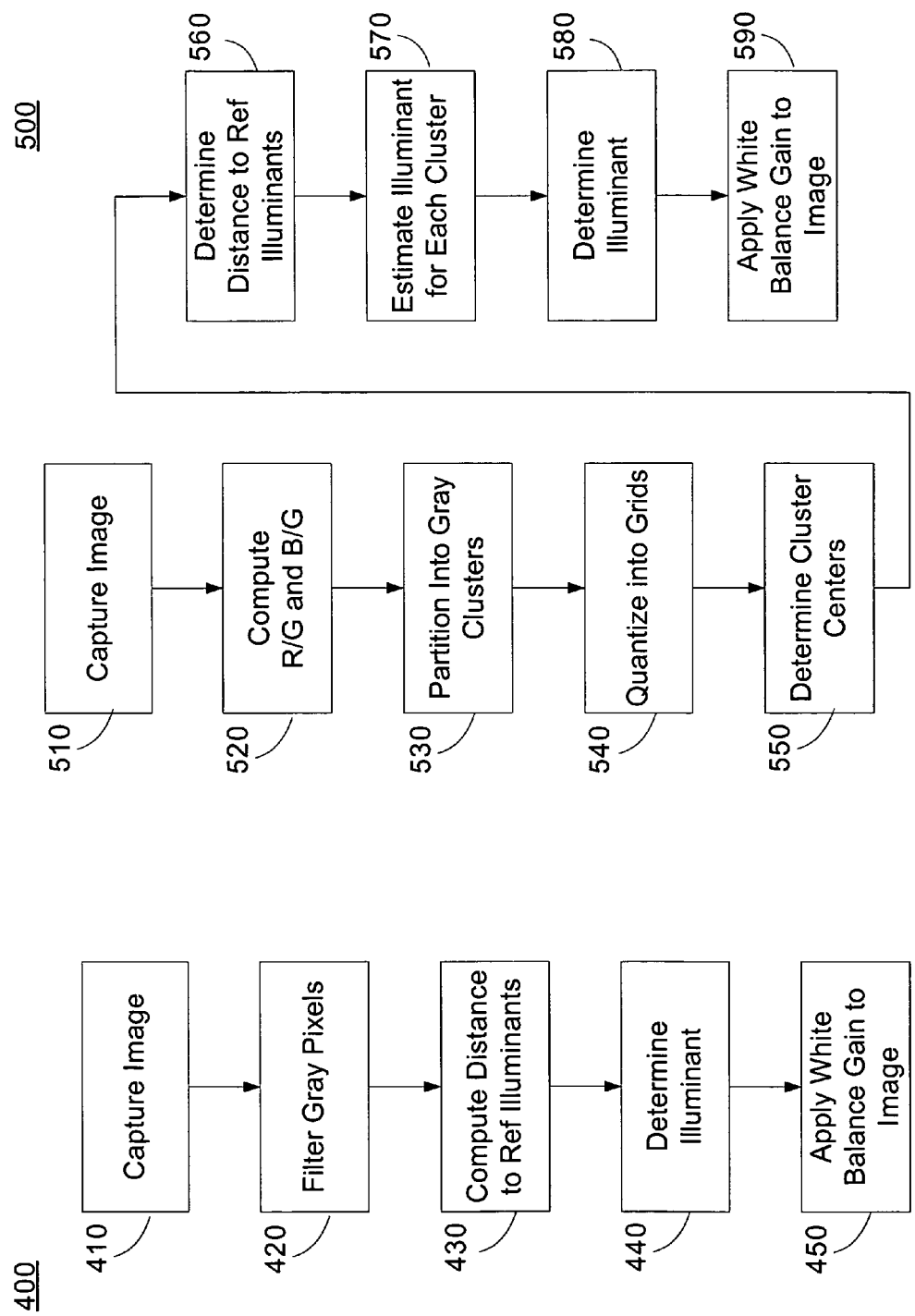

AUTOMATIC WHITE BALANCE METHOD AND APPARATUS

CROSS-REFERENCES TO RELATED APPLICATIONS

This application claims the benefit of U.S. Provisional Application No. 60/583,144, filed Jun. 25, 2004, entitled Method and Apparatus for Automatic White Balance; which is hereby incorporated herein by reference in its entirety.

BACKGROUND

Illumination sources, also referred to as illuminates herein, are not typically pure white, but instead have a bias towards a particular color. The color bias is usually measured in terms of a color temperature. The human eye compensates for illumination that is not pure white, so that colors appear relatively consistent over a wide range of lighting conditions. However, electronic sensors that are used to capture images are unable to compensate for differing lighting conditions having different color temperatures.

A typical sensor used in an electronic image capture device, such as a digital camera or digital video camera, will capture an image that exhibits a color shift attributable to illumination from a non-pure white source. The color shift exhibited in the captured image appears unnatural to the human eye and contributes to a perception that the sensor or capture device is of low quality and unable to accurately capture real world images.

The captured image can be processed to compensate for the lighting conditions and color temperature of the illuminant. However, because the white balance compensation depends on the color temperature of the illuminant, the application of a white balance compensation configured for an illuminant at a first color temperature typically does not correct for the color temperature of a second illuminant, and may further degrade the image quality by introducing additional color shift into the image.

BRIEF SUMMARY

Automatic white balance of captured images can be performed based on a gray world assumption. Initially, a flat field gray image is captured for one or more reference illuminations. The statistics of the captured gray image are determined and stored for each reference illumination during a calibration process. For each subsequent captured image, the image is filtered to determine a subset of gray regions. The gray regions are further partitioned into a one or more gray clusters. The average weight of the one or more gray clusters is determined and a distance from the average weights to the reference illuminants is determined. An estimate of the illuminant is determined depending on the distances. White balance gains are applied to the image based on the estimated illuminant.

In one aspect, a method of performing Automatic White Balance (AWB) is presented, the method including: receiving a captured image, filtering the captured image to select gray pixels, determining a distance in a coordinate grid from each of a plurality of reference illuminant points to a location in the coordinate grid determined at least in part on the gray pixels, determining an illuminant based in part on the distances, and applying a white balance gain to the captured image based in part on the illuminant.

In another aspect, another method of performing Automatic White Balance (AWB) is presented, the method including: receiving a captured image in RGB format, filtering the captured image to select gray pixels, determining R/G and B/G ratios for each of the gray pixels in the captured image, partitioning the gray pixels into a plurality of gray clusters, quantizing the R/G and B/G ratios into a predetermined coordinate grid, determining a center in the coordinate grid for each of the plurality of gray clusters, determining a distance in the coordinate grid from each of the centers to each of a plurality of reference illuminant points, determining an estimated illuminant for each cluster based in part on the distance to each of the centers, determining a scene illuminant based in part on the estimated illuminant for each of the plurality of gray clusters, and applying a white balance gain to the captured image based in part on the scene illuminant.

In another aspect, an apparatus is presented for performing Automatic White Balance (AWB), the apparatus including: a gray filter configured to receive a captured image and select gray regions from the captured image, a grid converter coupled to the gray filter and configured to transform the gray regions to a predetermined coordinate grid, a distance module coupled to the grid converter and configured to determine distances in the predetermined coordinate grid from one or more locations based in part on the gray regions to each of a plurality of reference illuminant points, an illuminant estimator coupled to the distance module and configured to determine an illuminant based in part on the distances, and a white balance gain module coupled to the illuminant estimator and configured to apply a white balance gain to the captured image; the white balance gain based in part on the illuminant.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 3 is a flowchart of an embodiment of a method of establishing an illuminant reference.

FIG. 4 is a flowchart of an embodiment of a method of automatic white balance.

FIG. 5 is a flowchart of an embodiment of a method of automatic white balance.

DETAILED DESCRIPTION OF SOME EMBODIMENTS

Gray world assumption can form the basis for performing white balance in digital photography. It has been observed among a large collection of photos that the average of the colors of pixels in an image is roughly gray. Although there are exceptions depending on the scene, the gray world assumption works quite well and offers a reliable basis for performing white balance. The Automatic White Balance (AWB) method and apparatus disclosed herein are based on the gray world assumption combined with an outlier removal. A digital camera or some other image processing device can be configured to perform the AWB methods described herein.

The methods are described in reference with an image capture device, such as a digital camera. However, there is no requirement that the image capture sensor be implemented within the device. Indeed, an electronic device can be configured to perform the AWB method on remotely captured images.

The digital camera can initially divide the image into a number of regions. The digital camera can filter the image to pass gray regions and to reject non-gray regions. The digital camera uses the gray regions to determine the illuminant and does not rely on the non-gray regions. As used herein, the terms "gray region" and "gray pixel" refer to those gray and near-gray regions or pixels, respectively, that are selected by the filter constraints and used in determining the illuminant.

After filtering the image to identify the gray regions, the digital camera transforms or otherwise converts the color characteristics of the gray regions to map onto a predetermined coordinate space or grid. The digital camera can locate one or more reference points within the grid corresponding to a gray reference obtained by capturing a gray image illuminated with a particular illuminant. Therefore, the digital camera can locate on the grid a reference point for each illuminant.

After converting the gray regions to map onto the coordinate system, the digital camera can determine, for each of the gray regions, a distance from the gray region to each of the illuminant reference points. The digital camera can filter the gray regions by determining poor statistical gray regions and removing those outlier regions from consideration. The digital camera can determine, for example, a minimum distance from each of the regions to any of the illuminant reference points. The digital camera can then compare the minimum distance against a predetermined threshold and eliminate from further processing those regions having minimum distances greater than the predetermined thresholds.

The digital camera then compares the distances from the remaining gray regions to each of the illuminant reference points. The digital camera can estimate the illuminant as the illuminant having the illuminant reference point nearest the gray regions.

Figure 1:
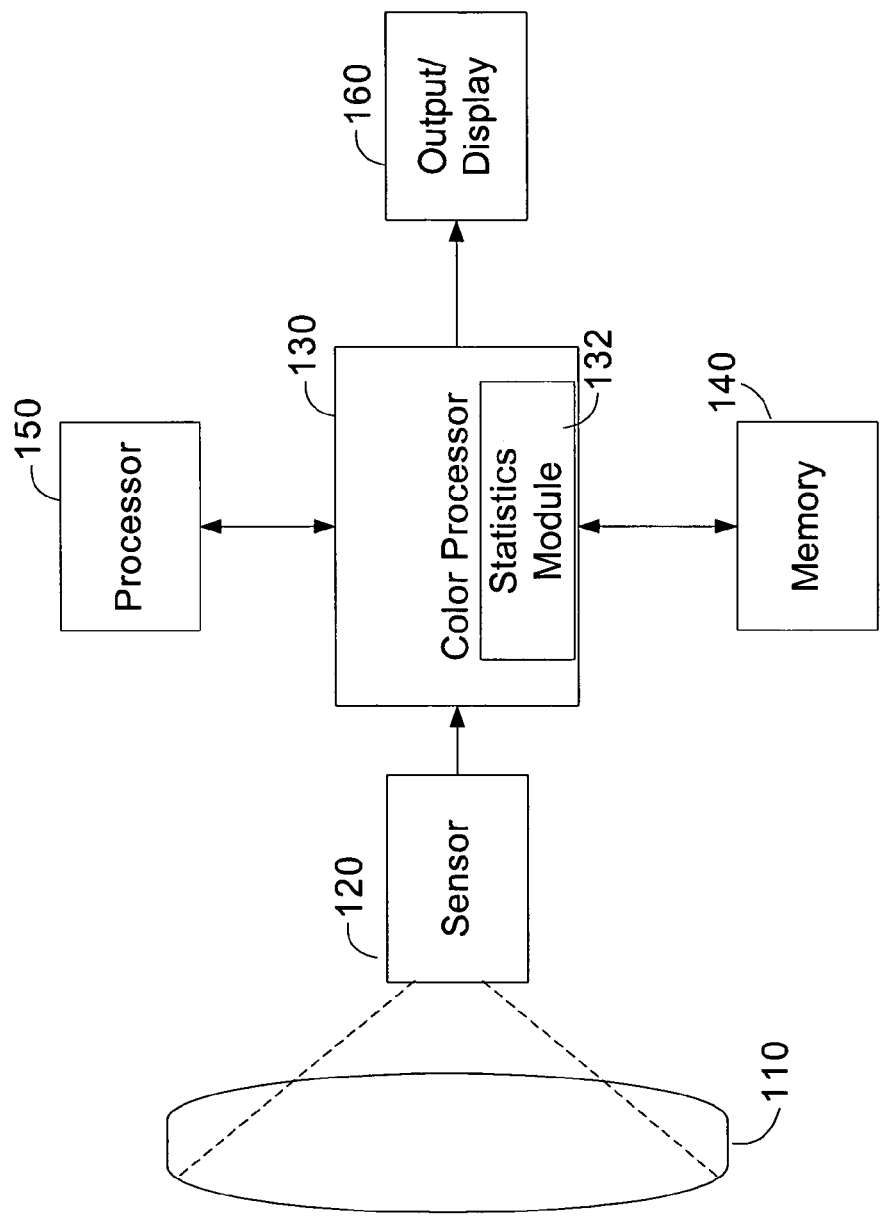
FIG. 1 is a functional block diagram of an embodiment of an image capture device having automatic white balance.

FIG. 1 is a functional block diagram of an image capture device 100 implementing AWB. The image capture device 100 can be, for example, a digital camera, a digital video recorder, a wireless phone having a digital camera, or some other image capture device. The image capture device 100 can include a lens 110 positioned relative to a sensor 120, which may be, for example, an optical sensor that can be configured to convert incident light into electronic representations. For example, the sensor can be a Charge Coupled Device (CCD), CMOS detector, photodiode array, photovoltaic detector, and the like, or some other sensor for capturing an optical image. The sensor 120 can be configured to generate the electronic representation in the form of light components. For example, the sensor 110 may generate distinct R, G, and B representations for the captured image.

The output of the sensor 120 can be coupled to an color processor 130 that can be configured to provide AWB. The color processor can include a statistics module 132 that can be configured to gather and process statistics of captured images. As will be discussed in further detail below, the color processor 130, in conjunction with the statistics module 132, can be configured to measure or otherwise determine the lighting conditions illuminating the scene captured in the image. The color processor 130 can determine an illuminant based in part on statistics stored for a plurality of reference illuminants. The color processor 130 can be configured to apply the correction to the captured image to correct the color balance of the image. The color processor 130 and statistics module 132 can be configured to perform some or all of the associated functions using a processor 150 operating in conjunction with memory 140. In some embodiments, some or all of the functions of the color processor 130 and statistics module 132 can be stored as software in the memory 140 in the form of one or more processor usable instructions. The processor 150 can be configured to access the processor usable instructions and operate on them to perform the associated function.

The color processor 130 can be configured to store the reference illuminant statistics and information in an external memory 140 and may also be configured to store the captured images or the AWB corrected images in the memory 140. Alternatively, or additionally, the color processor 130 can be configured to communicate the raw or AWB corrected image to an output/display 160.

The output/display 160 can include a display device, such as a LCD, a LED array, a CRT, and the like, or some other display device. The output/display 160 can also include a one or more output ports. For example, the AWB corrected images can be output to a port or connector. The color processor 130 can be configured to output the AWB corrected image directly to the output/display 160 or may be configured to convert the AWB corrected image to a particular format, such as a standard display or file format prior to communicating the corrected image to the output/display 160. For example, the color processor 130 can be configured to format the AWB corrected image to a JPEG, GIF, or some other image format. The output/display 160 may be a communication device, such as a modem or wireless transceiver configured to transmit the AWB corrected image to a destination device (not shown).

Figure 2:
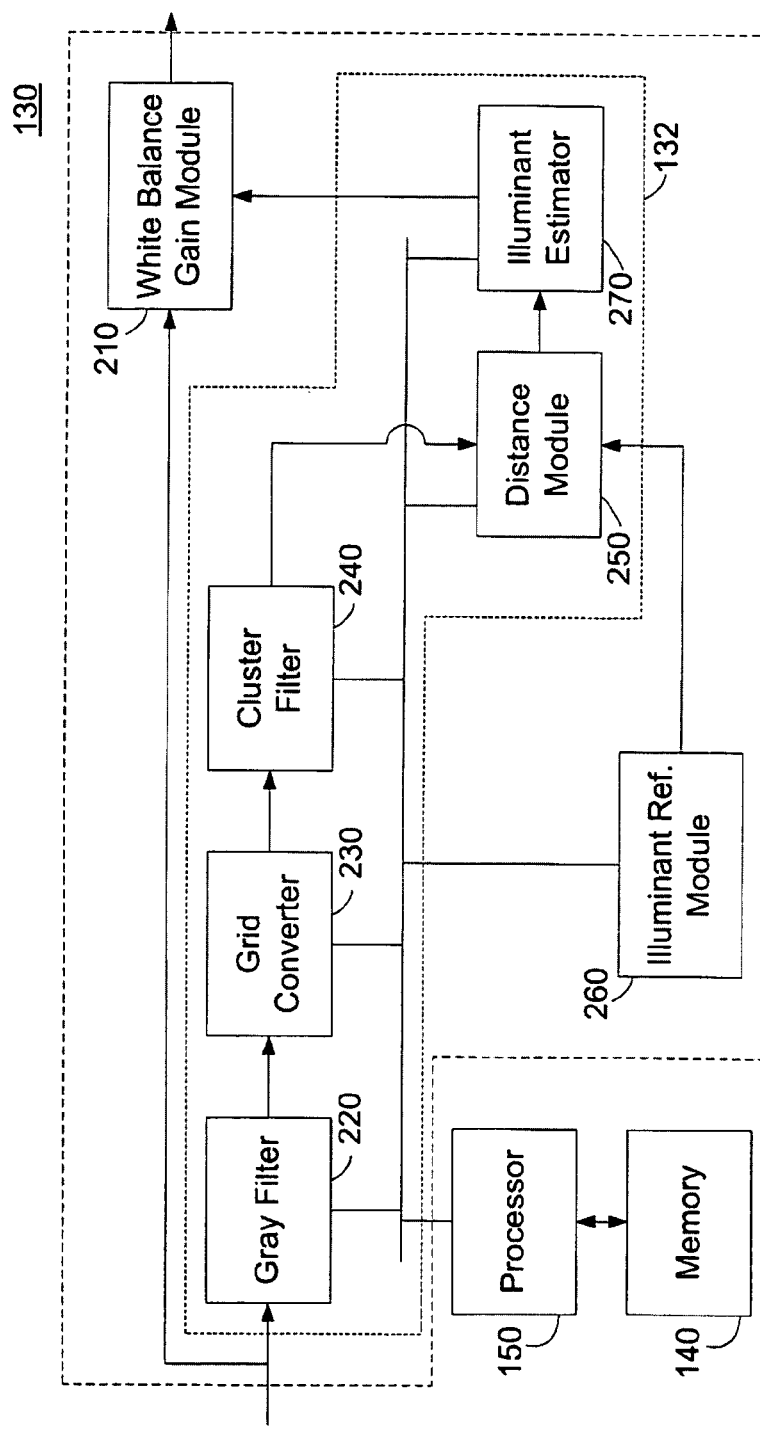
FIG. 2 is a functional block diagram of an embodiment of an image processor configured for automatic white balance.

FIG. 2 is a functional block diagram of a color processor 130 and statistics module 132 operating in a image capture device, such as the image capture device of FIG. 1. As in the embodiment of FIG. 1, the image capture device can include a color processor 130 having a statistics module 132 coupled to a processor 150 and memory 140.

The color processor 130 can include an input configured to receive a captured image. The captured image can be coupled to an input of the statistics module 132 and to an input of a white balance gain module 210. The white balance gain module 210 can be configured to apply white balance gains according to the output of the statistics module 132.

The statistics module 312 can be configured to couple the captured image to a gray filter 220 that can be configured to process the captured image to select gray objects that can be used to determine an illuminant. Because the captured image is typically in the form of digital packets or a digital file, it may be advantageous to implement the digital filter 220 as a digital processor.

The sensor, for example the sensor 120 of FIG. 1, can be configured to capture the image in any one of a variety of color formats, such as RGB, YCrCb, or some other color format. The gray filter 220 can be configured to process a particular color format to facilitate the gray object filtering. For example, the gray filter 220 can be configured to perform initial gray filtering of images in YCrCb format to facilitate the filtering process. The gray filter 220 can be configured to transform the captured image to the YCrCb format if it is not already in the format. The Y, Cb, and Cr color format can be derived from RGB color format information using the following color transformation, where Y is the luminance defined in Rec. 601, Cb is simply the color difference of B and G, and Cr is the color difference of R and G.

$$\begin{bmatrix} Y \\ Cb \\ Cr \end{bmatrix} = \begin{bmatrix} 0.299 & 0.587 & 0.114 \\ 0 & -1 & 1 \\ 1 & -1 & 0 \end{bmatrix} \times \begin{bmatrix} R \\ G \\ B \end{bmatrix}$$

In one embodiment, the gray filter 220 can filter the captured image to select gray regions by selecting those regions within a predetermined luminance range and then selecting from the remaining regions, those regions that satisfy predetermined Cr and Cb criteria. The gray filter 220 can use the luminance value to remove regions that are too dark or too bright. These regions are excluded due to noise and saturation issues. The gray filter 220 can express the filter as a number of equations, where regions that satisfy the following 6 inequalities are considered as possible gray regions.

$$Y <= Y_{max}, \quad (1)$$

$$Y >= Y_{min}, \quad (2)$$

$$Cb <= m1*Cr+c1, \quad (3)$$

$$Cr >= m2*Cb+c2, \quad (4)$$

$$Cb >= m3*Cr+c3, \quad (5)$$

$$Cr <= m4*Cb+c4. \quad (6)$$

The values m1-m4 and c1-c4 can represent predetermined constants that are selected to ensure that the filtered objects accurately represent gray regions while maintaining a sufficiently large range of filtered objects to ensure that an illuminant can be estimated for nearly all captured images. In some embodiments, the gray filter 220 may apply more than one set of filtering criteria and filter the regions based on the multiple criteria.

The gray filter 220 can operate on regions of nearly any size. For example, the minimum regions size can correspond to a single pixel. Similarly, the maximum regions size can correspond to the size of the captured image. However, typically, the gray filter 220 operates on regions smaller than the captured image size. Typically, the image is divided into a plurality of regions and the gray filter 220 operates on each of the regions.

An image can be divided to contain L×M rectangular regions, where L and M are positive integers. Then N=L×M represents the total number of regions in an image. In one embodiment, the gray filter 220 can divide the captured image into regions of 16×16 pixels. The gray filter 220 can transform the pixels of the captured image for example, from RGB components to YCrCb components. The gray filter 220 can filter the pixels using the above inequalities to select possible gray pixels. The gray filter 220 can be configured to sub-sample or otherwise decimate the pixels in either or both of the vertical and horizontal directions for large image sizes in order to reduce the number of computations. For example, in one embodiment, the gray filter 220 can be configured to sub-sample the horizontal and vertical pixels by a factor of two for images having 1.3 Megapixels or greater.

The gray filter 220 can then process the filtered pixels to generate statistics of each of the regions. For example, the gray filter 220 can determine a sum of the filtered or constrained Cb, the sum of the filtered or constrained Cr, the sum of filtered or constrained Y, and the number of pixels selected according to the constraints for sum of Y, Cb and Cr. From the region statistics, the gray filter 220 determines each region's sum of Cb, Cr and Y divided by the number of selected pixels to get the average of Cb (aveCb), Cr, (aveCr) and Y (aveY). The gray filter 220 can then transform the statistics back to RGB components to determine an average of R, G, and B. The average R, G, and B values can be determined from aveY, aveCb and aveCr by the following equation.

$$\begin{bmatrix} aveR \\ aveG \\ aveB \end{bmatrix} \equiv \begin{bmatrix} 1.000 & -0.114 & 0.701 \\ 1.000 & -0.114 & -0.299 \\ 1.000 & 0.886 & -0.299 \end{bmatrix} \times \begin{bmatrix} aveY \\ aveCb \\ aveCr \end{bmatrix}$$

Figure 6:
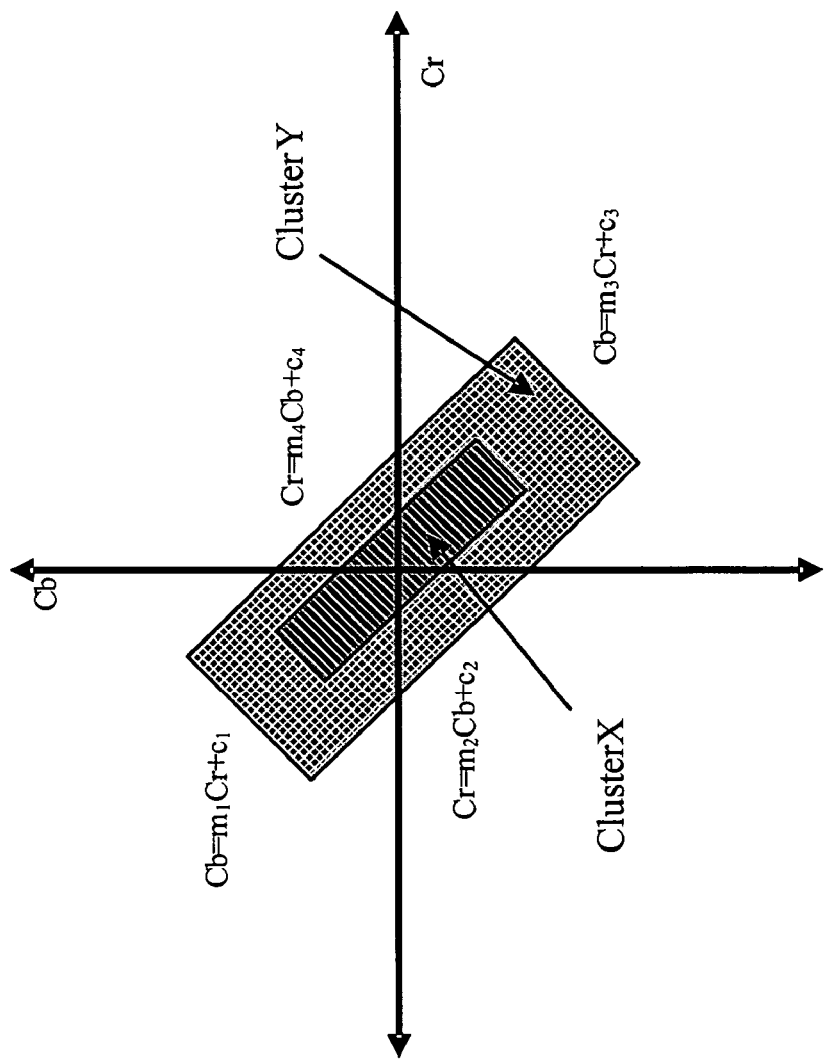
FIG. 6 is an illustration of an example of an embodiment of gray filtering.

The gray filter 220 can group the regions into one of two clusters, as shown in FIG. 6. The gray filter 220 can use the four CbCr constraints, to group each region into one of two different clusters; Cluster X for gray regions, and Cluster Y for higher saturation regions. The concept of this partitioning is that the gray regions of Cluster X may provide more reliable illumination estimation than the more saturated regions or Cluster Y. However, the regions in both clusters are used to maintain a reasonable confidence that the proper illuminant can be estimated in case the number of gray regions is not sufficient to make an accurate estimate.

The gray filter 220 communicates the identity of the regions and their statistics to a grid converter 230 that is configured to transform the region statistics to a grid coordinate system to determine a relationship to reference illuminants formatted for the coordinate system. In one embodiment, the grid converter 230 converts and quantizes the region statistics into one of n×n grids in an (R/G, B/G) coordinate system. The grid distance need not be partitioned linearly. For example, a coordinate grid can be formed from non-linear partitioned R/G and B/G axes. Non-linear partitioned grid coordinates may perform better than a linearly partitioned grid when determining grid distance. The grid converter 230 can discard pairs of (aveR/aveG, aveB/aveG) that are outside of a predefined range, such as [¼, 4]. The grid converter 230 can advantageously transform the region statistics into a two-dimensional coordinate system. However, the use of a two-dimensional coordinate system is not a limitation, and the grid converter 230 can be configured to use any number of dimensions in the coordinate system. For example, in another embodiment, the grid converter 230 can use a three-dimensional coordinate system corresponding to R, G, and B values normalized to some predetermined constant.

The grid converter 230 can be configured to communicate the transformed grid values to a cluster filter 240 that can be configured to group the grid values corresponding to the filtered regions into the clusters defined in the gray filter 220. For example, the grid converter 230 can be configured to group the grid values from the grid converter 230 into Cluster X and Cluster Y groups defined by the constraints applied in the gray filter 220. Of course, the grid filter 240 and gray filter 220 can define and group the region statistics into more than two groups.

The cluster filter 240 can be configured to provide the groups of grid values to a distance module 250 based in part on the grouping. For example, in the embodiment described above, the grid values corresponding to Cluster X may correspond to better gray region approximations. The cluster filter 240 can be configured to initially communicate to the distance module 250 the grid values corresponding to Cluster X. If the distance module 250 and illuminant estimator 270 are able to determine an illuminant estimate with a high degree of confidence, the cluster filter 240 may omit further processing of the Cluster Y grid values. In another embodiment, the cluster filter 240 can be configured to communicate the Cluster X values followed by the Cluster Y values in those embodiments where the grid values from both clusters are used to determine an illuminant estimate.

The output from the cluster filter can be coupled to one input of a distance module 250. An output from an illuminant reference module 260 can be coupled to a second input of the distance module 250. The illuminant reference module 260 provides the locations of reference illuminants to the distance module 250.

The illuminant reference module 260 can be configured to store statistics for one or more reference illuminants. The statistics for the one or more reference illuminants are predetermined during a calibration routine.

The characterization process typically takes place off-line for a given a sensor module, for example the combination of the sensor 120 and lens 110 of the image capture device 100 of FIG. 1. Off-line refers to processing during a period that a typical consumer is not using the image capture device, and may refer to a period in the manufacturing process. For outdoor lighting condition, a series of pictures of gray objects corresponding to various times of the day is collected. The pictures can includes images captured in direct sun light during different times of the day, cloudy lighting, outdoor in the shade, etc. The R/G and B/G ratios of the gray objects under these lighting conditions are recorded. For indoor lighting condition, images of gray objects can be captured using warm fluorescent light, cold fluorescent light, incandescent light and the like, or some other illuminant. Each of the lighting conditions is used as a reference point. The R/G and B/G ratios are recorded for indoor lighting conditions.

In another embodiment, the reference illuminants can include A (incandescent, tungsten, etc.), F (florescent), and multiple daylight illuminants referred to as D30, D50, and D70. The three daylight illuminant can form an approximated blackbody line by interpolation. The (R/G, B/G) coordinates of the reference coordinates can be ideally defined by the illuminant colors which are calculated by integrating the sensor modules' spectrum response and the illuminants' power distributions.

After determining the scale of the R/G and B/G ratios, the reference points are located on a grid coordinate. The scale is determined in a way that the grid distance can be used to properly differentiate between different reference points. The illuminant reference module 260 can generate the illuminant statistics using the same coordinate grid used to characterize the gray regions.

The distance module 250 can be configured to determine the distance from each grid point received from the cluster filter 240 to all the reference points from the illuminant reference module 260. The distance module 250 can compare the determined distances against a predetermined threshold, and if the shortest distance to any reference point exceeds the predetermined threshold, the point is considered as an outlier and is excluded.

Note that, by definition, all the reference points corresponds to gray objects under different lighting conditions, if the collected data point received from the cluster filter 240 is not close to any of the reference points, it's not a gray object. If such an outlier point is included in the distance calculation, it will generate a large distance and have a negative impact on the overall distance comparison. Therefore, data points having large minimum distances can be viewed as outliers and removed. If the data point is not an outlier, the distance to all reference points are determined. In one embodiment, the distance to a particular reference point can be summed with all other data point distances to that same reference point.

After all the data points are processed such that outliers are removed and the distance to all reference points are summed, there are K numbers which are the sum of distance for all reference points corresponding to K reference points.

The distance module 250 can be configured to communicate each distance to the illuminant estimator 270 or can be configured to determine the sums and communicate the sum of distances for each of the reference points to the illuminant estimator 270. The distance module 270 can determine the minimum distance to the reference points and can determine the lighting condition corresponding to the reference point.

In one embodiment, the cluster filter 240 is configured to group the image statistics into two groups, labeled Cluster X and Cluster Y. For each data point in both Cluster X and Cluster Y, the distance module 250 can be configure to determine at least three different distances. The distance module 250 can determine, for example, the distance to reference illuminant A (Ref. A), the distance to reference illuminant F (Ref F), and the distance to a blackbody line formed by reference daylight illuminants.

The distance module 250 can be configured to determine distance metrics such as Euclidean, Manhattan (City Block), or some other metric can be used depending on computation complexity requirement and performance requirements. Inn other embodiments, the distance module 250 can be configured to determine a center or gravity corresponding to each of the clusters, and can be configured to determine a distance from the cluster center of gravity to each of the reference illuminant points.

In one embodiment, the overall distance to a daylight reference point, D65, can be 125, to a warm fluorescent reference point, WF, can be 324, to a cold fluorescent reference point, CF, can be 421. The illuminant estimator 270 can determine that the distance to D65 (=125) is the smallest among all the numbers. The illuminant estimator 270 can then determine that D65 is the lighting condition, and the corresponding R/G and B/G ratios of D65 are used to perform white balance.

In case there is a tie situation, the illuminant estimator 270 can use the sensor exposure and gain setting to assist the determination of the lighting condition. Depending on the exposure setting, the illuminant estimator 270 can use the exposure and gain settings to decide whether the scene in the captured image is outdoor or indoor and can assist in the AWB decision.

In the rare event that there is no data point that passes the pixel selection process and outlier removal process, the illuminant estimator 270 can use a combination of the exposure setting and overall R/G and B/G ratios to make a decision. If the captured image represents an outdoor scene, the D65 R/G and B/G ratios are averaged with the overall R/G and B/G ratios as AWB gains. If the captured image corresponds to an indoor scene, the WF R/G and B/G ratios are averaged with the overall R/G and B/G ratios as AWB gains. In the event that a flash or strobe is used to illuminate the scene, the R/G and B/G ratios of the flash are used as white balance gains.

The illuminant estimator 270 can be configured to provide the white balance gains to the white balance gain module 210 where the captured image is corrected for the illuminant. In another embodiment, the illuminant estimator can be configured to provide the illuminant estimate to the white balance gain module 210 and the white balance gain module 210 can determine the white balance gains and apply the gains to the captured image.

The white balance (WB) gains for the reference illuminants can be predefined. In one embodiment, each reference's WB gain can be defined by the following equation, where row-vector SSr, SSg, and SSb are the sensor module's spectrum response (sensor+IR cut-off+lens), $L_{n \times n}$ is the diagonal matrix of the reference illuminant's power distribution, and $W(R)_{n \times 1}$ is an identity column vector representing a perfect white diffuser.

$$\begin{bmatrix} R_{ref} \\ G_{ref} \\ B_{ref} \end{bmatrix} \equiv \begin{bmatrix} SSr \\ SSg \\ SSb \end{bmatrix}_{3 \times n} \cdot L_{n \times n} \cdot W(R)_{n \times 1}$$

The WB gain can be defined by the following formula.

$$WBgain = \begin{bmatrix} \frac{R_{ref}}{G_{ref}} \\ 1 \\ \frac{B_{ref}}{G_{ref}} \end{bmatrix}$$

In the case that the sensor module's spectrum response is not available, the WB gains may be obtained by averaging raw R, G, and B values of images of a perfect white diffuser under the reference illuminants by the sensor modules. To account for part-to-part variations in sensor modules, multiple units may be characterized and the responses averaged.

Once the illuminant estimator 270 determines the illuminant, the illuminant estimator 270 or the white balance gain module 210 can define the WB gains as follows. If the estimated illuminant is a particular reference illuminant, for example reference A, the white balance gain module applies the WB gain corresponding to that reference illuminant. If the estimated illuminant is daylight illuminant, the WB gain shall be determined as follows:

If the estimated Correlated Color Temperature (CCT) is between daylight illuminants D1 and D2, then:

$$WBgain = \frac{CCT_{estimated} - CCT_{D1}}{CCT_{D2} - CCT_{D1}} \times WBgain_{D1} + \frac{CCT_{D2} - CCT_{estimated}}{CCT_{D2} - CCT_{D1}} \times WBgain_{D2}$$

If the estimated CCT is between daylight illuminants D2 and D3, then:

$$WBgain = \frac{CCT_{estimated} - CCT_{D2}}{CCT_{D3} - CCT_{D2}} \times WBgain_{D2} + \frac{CCT_{D3} - CCT_{estimated}}{CCT_{D3} - CCT_{D2}} \times WBgain_{D3}$$

To summarize one embodiment of the AWB process, the captured image can be gray filtered to select those regions that are likely to be gray regions. The regions can be partitioned into plurality of clusters. The selected regions are then mapped onto a predetermined coordinate system. The center of gravity of each of the clusters can be computed within the coordinate system. One or more reference illuminant points can be located within the coordinate system. The distance between each of the centers of gravity of the clusters and each of the reference illuminant points can be determined. The illuminant corresponding to each of the clusters can be estimated and from the estimates a final illuminant can be determined. The white balance gains can be determined based on the illuminant and the white balance gains applied to the captured image.

FIG. 3 is a flowchart of an embodiment of a method 300 of establishing the reference illuminant points stored in the illuminant reference module 260 and used by the distance module 250 of the color processor of FIG. 2. The method 300 can be performed by the color processor of FIG. 2, with the exception of the act of illuminating the gray field with a reference illuminant, which is typically performed externally.

The method 300 begins at block 310 when a gray field is illuminated with a reference illuminant. The reference illuminant can be, for example, an incandescent source, a halogen source, a tungsten source, a fluorescent source, daylight at particular times of day, or some other light source. The gray field can be a flat field that is uniformly illuminated.

The method proceeds to block 320 where the color processor captures the image. In one embodiment, the color processor captures the image by controlling a sensor and lens combination. In another embodiment, the color processor captures the image by receiving an image captured by a remote sensor.

After capturing the image, the color processor proceeds to block 330 to establish an illuminant reference point corresponding to the captured image. In one embodiment, the color processor can determine the R/G and B/G ratios for the pixels of the captured image and determine an average value that represents the reference point for the illuminant.

The color processor then proceeds to decision block 340 to determine if all reference illuminants have been measured. If so, the color processor proceeds to block 360 and is done. If, at decision block 340, the color processor determines that not all illuminants have been measured, the color processor proceeds to back to block 310 to await illumination of the gray field with the next reference illuminant.

FIG. 4 is a flowchart of an embodiment of a method 400 of automatic white balance that can be performed by the image capture device of FIG. 1. The image capture device can perform the method 400 using the color processor of FIG. 1 or FIG. 2 in combination with the sensor and lens of FIG. 1.

The method 400 begins at block 410 when the image capture device captures an image. The image capture device proceeds to block 420 and filters the gray pixels from the image. The image capture device then proceeds to block 430 and determines the distance to the reference illuminants. The image capture device can determine, for example, the distance from each pixel to each of the reference illuminants, the distance from each of a plurality of regions having the gray pixels to the reference illuminants, a distance from a subset of selected gray pixels to each of the reference illuminants, a distance from one or more centers of gravity corresponding to one or more groupings of gray pixels to each of the reference illuminants, or some other distance.

After determining the distances, the image capture device proceeds to block 440 and determines an illuminant based at least in part on the distances. For example, the image capture device can determine the illuminant based on smallest distance. In another embodiment, the image capture device can determine the illuminant based in part on the distances of each of a plurality of clusters to a reference illuminant or an illuminant defined by the reference illuminants.

After determining the illuminant, the image capture device proceeds to block 450 and applies a white balance gain to the captured image. The image capture device can determine the white balance gains based in part on the illuminant.

FIG. 5 is a flowchart of an embodiment of a method 500 of automatic white balance that can be performed by the image capture device of FIG. 1. As was the case with the automatic white balance method 400 of FIG. 4, the image capture device can perform the method 500 using the color processor of FIG. 1 or FIG. 2 in combination with the sensor and lens of FIG. 1.

The method 500 begins at block 510 where the image capture device captures an image using, for example, a sensor in combination with a lens. The sensor can be configured to output the image in R, G, and B components. After capturing the image, the image capture device proceeds to block 520, divides the image into a predetermined number of blocks and computes the ratio of R/G and B/G for each region. The value of R/G and B/G can be, for example, average R/G and B/G values for the pixels within the regions.

After computing the R/G and B/G values, the image capture device proceeds to block 530 and partitions the regions into gray clusters. Those regions that do not correspond to gray regions can be excluded from further processing. The image capture device can, for example, filter the computed R/G and B/G statistics for each of the regions according to predetermined criteria to determine one or more gray regions, such as shown in FIG. 6. The gray regions can be further partitioned into clusters according to further criteria. The criteria for determining the gray clusters can be determined using the same R, G, and B color components provided by the sensor, or may be in terms of other color components, such as Y, Cr, and Cb. In some embodiments, the image capture device transforms the captured image from one color component format to another.

Figure 7:
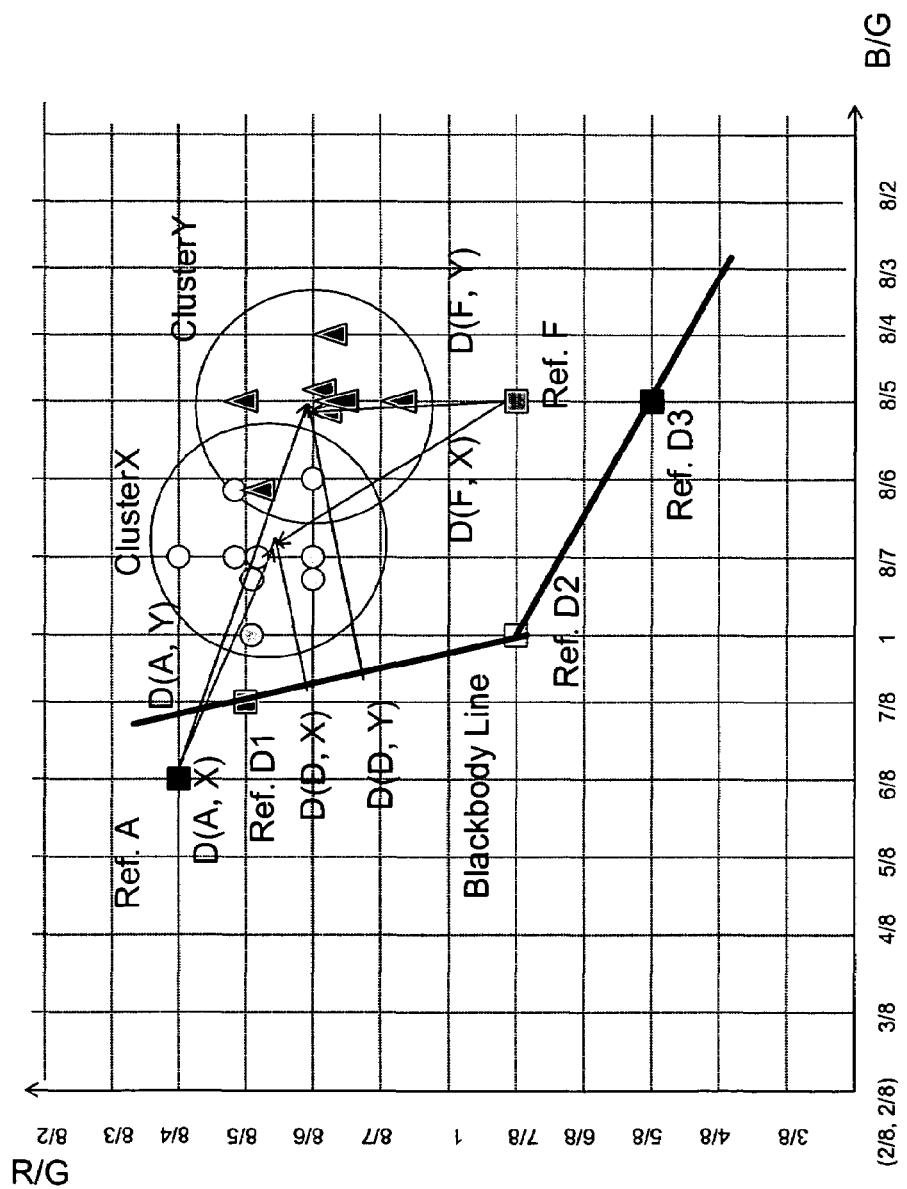
FIG. 7 is an illustration of an example of determining distances between gray clusters and reference illuminants.

After partitioning the image statistics into gray clusters, the image capture device can proceed to block 540 and quantize the filtered regions from each of the clusters into a predetermined coordinate system or grid. The coordinate system can be, for example, a two-dimensional coordinate system based on R/G and B/G. The coordinate grid need not be linearly partitioned, and may have non-linearly partitioning, as shown in FIG. 7. An example of a coordinate grid having multiple reference illuminants and gray region data from a captured image grouped according to two clusters is shown in FIG. 7.

The image capture device proceeds to block 550 and determines the center of each of the clusters of gray regions. The image capture device can determine, in one embodiment, a center of gravity of each of the clusters. In another embodiment, the image capture device can determine a center of each cluster using a weighted average of the regions within each cluster.

After determining the center of each of the clusters, the image capture device proceeds to block 560 and determines the distance from each of the cluster centers to each of the reference illuminants. In one embodiment, the reference illuminants includes incandescent and tungsten illuminants corresponding to a reference point labeled "A" in FIG. 7, fluorescent illuminants corresponding to a reference point labeled "F" in FIG. 7, and three daylights corresponding to reference points labeled "D50", and "D70" in FIG. 7. The three daylight illuminants form an approximated blackbody line by interpolation.

The image capture device can be configured to determine a distance from the center of each cluster to the A reference, the F reference, and the nearest point on the blackbody line joining the daylight illuminants.

After determining the distances, the image capture device can proceed to block 570 and estimate the illuminant for each of the clusters. The image capture device can, for example, estimate the illuminant as the illuminant corresponding to the smallest determined distance.

The image capture device can then proceed to block 580 to determine the illuminant based on the estimated illuminant corresponding to each of the clusters. Because the image capture device can estimate an illuminant for more than one cluster, the estimated illuminants may not match. Also, the image capture device may not determine an illuminant if the distances for each of the reference illuminants exceeds a predetermined threshold.

If the estimated illuminants match, the image capture device determines that the illuminant is the estimated illuminant. However, even if all estimated illuminants are to daylight illuminants, the estimated illuminants may correspond to different points on the blackbody line.

If the estimated illuminants are in agreement to be daylight and their Correlated Color Temperature (CCT) difference is within a preset value, the estimated CCT can be the average of the two. If the estimated illuminants are in agreement to be daylight illuminants and their CCT difference exceeds a preset value, then the estimated CCT may depend on the unconstrained average luminance, Y, to determine daylight brightness, any previous estimations of the same date with known time, and the number of regions in each of the clusters.

If the estimated illuminants are not in agreement, including the condition where one or more of the illuminants is not estimated because of a lack of gray regions in the cluster, then the final estimation may depend on other factors. The factors include an estimate of possible scenes determined using Cb and Cr histograms derived from the captured image to determine whether the scene is indoor or outdoor. The factors can also include the unconstrained average luminance, Y, that can also be used to determine either indoor or outdoor environment. The factors can also include distances to the multiple different reference illuminants, previous estimations of the same date with known time if they exist, and the number of instants in each of the clusters.

In one embodiment, the image capture device can determine the possible scene using template matching or simple if-then logics or expert system, depending on the computational complexity and memory requirement.

After determining the illuminant, the image capture device proceeds to block 590 and applies the white balance gains to the captured image. The color components of the captured image can be weighted or otherwise scaled by the white balance gains to achieve a white balanced image.

Methods and apparatus for automatic white balance of images in an image capture device based on a gray world assumption are described. The methods and apparatus can use gray world assumption to determine an illuminant in a captured image from a plurality of reference illuminants. The methods and apparatus can then determine white balance gains to be applied to the captured image to compensate for effects of a non-pure white illuminant used to illuminate a scene in a captured image.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of performing Automatic White Balance (AWB), the method comprising:
   receiving a captured image;
   filtering the captured image to select gray pixels;
   determining a distance in a coordinate grid from each of a plurality of reference illuminant points to a location in the coordinate grid determined at least in part on the selected gray pixels, wherein determining the distance to a first reference illuminant point comprises:
      determining a plurality of distances corresponding to a distance from the first reference illuminant point to each gray pixel; and
      summing the plurality of distances;
   determining an illuminant based in part on the distances; and
   applying a white balance gain to the captured image based in part on the illuminant.

2. The method of claim 1, wherein receiving the captured image comprises receiving a digital image file.

3. The method of claim 1, wherein receiving the captured image comprises receiving a digital image captured by an optical sensor.

4. The method of claim 1, wherein filtering the captured image comprises:
   selecting a first subset of pixels from the captured image having a luminance within a predetermined luminance range;
   selecting a second subset of pixels from the first subset of pixels, the second subset of pixels having a Cb chrominance component within a predetermined range; and
   selecting a third subset of pixels from the second subset of pixels, the third subset of pixels having a Cr chrominance component within a predetermined range.

5. The method of claim 1, wherein filtering the captured image comprises:
   selecting a first subset of pixels from the captured image having a luminance within a predetermined luminance range; and
   selecting a second subset of pixels from the first subset, the second subset of pixels contained within a predetermined rectangular region defined in Cb—Cr domain.

6. The method of claim 1, wherein determining the distance to a first reference illuminant comprises:
   determining a location of each of the gray pixels in the coordinate grid;
   determining a center of gravity based on the location of the gray pixels in the coordinate grid; and
   determining a distance from the center of gravity to each of the reference illuminant points.

7. The method of claim 1, wherein determining the illuminant comprises determining an illuminant corresponding to the reference illuminant point having a least distance.

8. An apparatus for performing Automatic White Balance (AWB), the apparatus comprising:
   a gray filter configured to receive a captured image and select gray regions from the captured image;
   a grid converter coupled to the gray filter and configured to transform the selected gray regions to a predetermined coordinate grid;
   a distance module coupled to the grid converter and configured to determine distances in the predetermined coordinate grid from one or more locations based in part on the selected gray regions to each of a plurality of reference illuminant points, wherein each of the one or more locations comprises a center of gravity of a subset of the gray regions;
   an illuminant estimator coupled to the distance module and configured to determine an illuminant based in part on the distances; and
   a white balance gain module coupled to the illuminant estimator and configured to apply a white balance gain to the captured image; the white balance gain based in part on the illuminant.

9. The apparatus of claim 8, further comprising a cluster filter coupled to the grid converter and configured to partition the gray regions into a plurality of gray clusters.

10. The apparatus of claim 8, further comprising an illuminant reference module coupled to the distance module and configured to store locations of the plurality of reference illuminant points.

11. The apparatus of claim 8, wherein each of the gray regions comprises one of a plurality of substantially equal sized regions from the captured image.

12. The apparatus of claim 8, wherein each of the gray regions comprises a pixel from the captured image.

13. The apparatus of claim 8, wherein each of the gray regions comprises a predetermined number of pixels from the captured image.

14. The apparatus of claim 8, wherein the gray filter is configured to select the gray regions based on a predetermined set of inequalities.

15. The apparatus of claim 8, wherein the gray filter is configured to select the gray regions having a luminance within a predetermined range.

16. The apparatus of claim 8, wherein the grid converter is configured to transform the gray regions to an R/G, B/G coordinate space.

17. The apparatus of claim 8, wherein each of the one or more locations comprises a location of one of the gray regions in a R/G, B/G coordinate space.

18. The apparatus of claim 8, wherein at least one of the distances comprises a distance from a center of gravity of a subset of gray regions to a reference illuminant point.

19. The apparatus of claim 8, wherein at least one of the distances comprises a distance from a center of gravity of a subset of gray regions to a line joining two of the plurality of reference illuminant points.

20. The apparatus of claim 8, wherein the plurality of reference illuminant points comprises an incandescent reference illuminant point.

21. The apparatus of claim 8, wherein the plurality of reference illuminant points comprises a fluorescent reference illuminant point.

22. The apparatus of claim 8, wherein the plurality of reference illuminant points comprises a daylight reference illuminant point.

23. An apparatus for performing Automatic White Balance (AWB), the apparatus comprising:
  means for receiving a captured image;
  means for filtering the captured image to select gray pixels;
  means for determining a location of each of the gray pixels in a coordinate grid:
  means for determining a center of gravity based on locations of a subset of the gray pixels in the coordinate grid:
  means for determining a distance from the center of gravity to each of the plurality of reference illuminant points:
  means for determining an illuminant based in part on the distances; and
  means for applying a white balance gain to the captured image based in part on the illuminant.

24. The apparatus of claim 23, further comprising means for generating the captured image.

25. The apparatus of claim 23, wherein the means for filtering comprises:
  means for selecting a first subset of pixels from the captured image having a luminance within a predetermined luminance range;
  means for selecting a second subset of pixels from the first subset of pixels, the second subset of pixels having a Cb chrominance component within a predetermined range; and
  means for selecting a third subset of pixels from the second subset of pixels, the third subset of pixels having a Cr chrominance component within a predetermined range.

26. The apparatus of claim 23, wherein the means for filtering comprises:
  means for transforming the captured image to a YCrCb format;
  means for excluding pixels from the captured image having Y values outside of a predetermined Y range; and
  means for excluding pixels from the captured image having Cb and Cr values outside of a predetermined Cb and Cr relationship.

27. A method of performing Automatic White Balance (AWB), the method comprising:
  receiving a captured image;
  filtering the captured image to select gray pixels, wherein the gray pixels are selected based at least on comparing Cr based values to Cb based values;
  determining a distance in a coordinate grid from each of a plurality of reference illuminant points to a location in the coordinate grid determined at least in part on the selected gray pixels;
  determining an illuminant based in part on the distances; and
  applying a white balance gain to the captured image based in part on the illurminant.

28. The method of claim 27, wherein receiving the captured image comprises receiving a digital image file.

29. The method of claim 27, wherein receiving the captured image comprises receiving a digital image captured by an optical sensor.

30. The method of claim 27, wherein filtering the captured image comprises:
  selecting a first subset of pixels from the captured image having a luminance within a predetermined luminance range;
  selecting a second subset of pixels from the first subset of pixels, the second subset of pixels having a Cb chrominance component within a predetermined range; and
  selecting a third subset of pixels from the second subset of pixels, the third subset of pixels having a Cr chrominance component within a predetermined range.

31. The method of claim 27, wherein filtering the captured image comprises:
  selecting a first subset of pixels from the captured image having a luminance within a predetermined luminance range; and
  selecting a second subset of pixels from the first subset, the second subset of pixels contained within a predetermined rectangular region defined in Cb—Cr domain.

32. The method of claim 27, wherein determining the distance to a first reference illuminant comprises:
  determining a location of each of the gray pixels in the coordinate grid;
  determining a center of gravity based on the location of the gray pixels in the coordinate grid; and
  determining a distance from the center of gravity to each of the reference illuminant points.

33. The method of claim 27, wherein determining the illuminant comprises determining an illuminant corresponding to the reference illuminant point having a least distance.

34. An apparatus for performing Automatic White Balance (AWB), the apparatus comprising:
  a gray filter configured to receive a captured image and select gray regions from the captured image, wherein the gray regions are selected based at least on comparing Cr based values to Cb based values;
  a grid converter coupled to the gray filter and configured to transform the selected gray regions to a predetermined coordinate grid;
  a distance module coupled to the grid converter and configured to determine distances in the predetermined coordinate grid from one or more locations based in part on the selected gray regions to each of a plurality of reference illuminant points;
  an illuminant estimator coupled to the distance module and configured to determine an illuminant based in part on the distances; and
  a white balance gain module coupled to the illuminant estimator and configured to apply a white balance gain to the captured image; the white balance gain based in part on the illuminant.

35. The apparatus of claim 34, further comprising a cluster filter coupled to the grid converter and configured to partition the gray regions into a plurality of gray clusters.

36. The apparatus of claim 34, wherein each of the gray regions comprises a predetermined number of pixels from the captured image.

37. The apparatus of claim 34, wherein the gray filter is configured to select the gray regions based on a predetermined set of inequalities.

38. The apparatus of claim 34, wherein the gray filter is configured to select the gray regions having a luminance within a predetermined range.

39. The apparatus of claim 34, wherein the grid converter is configured to transform the gray regions to an R/G, B/G coordinate space.

40. The apparatus of claim 34, wherein each of the one or more locations comprises a location of one of the gray regions in a R/G, B/G coordinate space.

41. A non-transitory storage medium storing a set of instructions, wherein the set of instructions when executed by one or more processors causes the one or more processors to perform:
- receiving a captured image;
- filtering the captured image to select gray pixels;
- determining a distance in a coordinate grid from each of a plurality of reference illuminant points to a location in the coordinate grid determined at least in part on the selected gray pixels, wherein determining the distance to a first reference illuminant point comprises:
  - determining a plurality of distances corresponding to a distance from the first reference illuminant point to each gray pixel; and
  - summing the plurality of distances;
- determining an illuminant based in part on the distances; and
- applying a white balance gain to the captured image based in part on the illuminant.

42. The non-transitory storage medium of claim 41, wherein receiving the captured image comprises receiving a digital image file.

43. The non-transitory storage medium of claim 41, wherein receiving the captured image comprises receiving a digital image captured by an optical sensor.

44. The non-transitory storage medium of claim 41, wherein filtering the captured image comprises:
- selecting a first subset of pixels from the captured image having a luminance within a predetermined luminance range;
- selecting a second subset of pixels from the first subset of pixels, the second subset of pixels having a Cb chrominance component with a predetermined range; and
- selecting a third subset of pixels from the second subset of pixels, the third subset of pixels having a Cr chrominance component within a predetermined range.

45. The non-transitory storage medium of claim 1, wherein filtering the captured image comprises:
- selecting a first subset of pixels from the captured image having a luminance within a predetermined luminance range; and
- selecting a second subset of pixels from the first subset, the second subset of pixels contained within a predetermined rectangular region defined in Cb-Cr domain.

46. The non-transitory storage medium of claim 1, wherein determining the distance to a first reference illuminant comprises:
- determining a location of each of the gray pixels in the coordinate grid;
- determining a center of gravity based on the location of the gray pixels in the coordinate grid; and
- determining a distance from the center of gravity to each of the reference illuminant points.

47. The non-transitory storage medium of claim 1, wherein determining the illuminant comprises determining an illuminant corresponding to the reference illuminant point having a least distance.

* * * * *

UNITED STATES PATENT AND TRADEMARK OFFICE
CERTIFICATE OF CORRECTION

PATENT NO. : 7,728,880 B2
APPLICATION NO. : 11/043572
DATED : June 1, 2010
INVENTOR(S) : Hung et al.

It is certified that error appears in the above-identified patent and that said Letters Patent is hereby corrected as shown below:

Column 14, line 63, claim 16: "BIG" to read as --B/G--

Column 14, line 67, claim 17: "RIG, BIG" to read as --R/G, B/G--

Column 15, line 67, claim 27: "illurninant" to read as --illuminant--

Column 17, line 5, claim 39: "BIG" to read as --B/G--

Column 17, line 9, claim 40: "RIG, BIG" to read as --R/G, B/G--

Signed and Sealed this
Fifth Day of July, 2011

David J. Kappos
*Director of the United States Patent and Trademark Office*